US006508903B1

(12) United States Patent
Peter et al.

(10) Patent No.: US 6,508,903 B1
(45) Date of Patent: Jan. 21, 2003

(54) METHOD OF MAKING A SECURITY LABEL

(75) Inventors: Johannes Maximillian Peter, Overland Park, KS (US); Mark Volz, Overland Park, KS (US)

(73) Assignee: Phenix Label Co., Olathe, KS (US)

( * ) Notice: Subject to any disclaimer, the term of this patent is extended or adjusted under 35 U.S.C. 154(b) by 0 days.

(21) Appl. No.: 09/408,713

(22) Filed: Sep. 30, 1999

(51) Int. Cl.[7] .......................... B32B 31/00; G08B 13/14

(52) U.S. Cl. ....................... 156/247; 156/253; 156/265; 156/272.4; 156/301; 156/302; 156/519; 156/520; 156/522; 40/675; 340/571; 340/572.1; 340/572.8; 283/70; 283/81; 283/82; 283/83

(58) Field of Search ................................ 156/247, 249, 156/264, 265, 270, 272.4, 298, 301, 302, 253, 519, 520, 522; 40/675; 340/571, 572.1, 572.8; 283/70, 81, 82, 83

(56) References Cited

U.S. PATENT DOCUMENTS 4,686,154 A 8/1987 Mejia ......................... 428/611
4,834,816 A 5/1989 Hasegawa et al. .......... 148/304
4,846,922 A * 7/1989 Benge et al. ............... 156/324
5,284,528 A 2/1994 Hasegawa ................... 148/304
5,732,979 A 3/1998 Finke et al. .................. 283/81
5,885,677 A 3/1999 Gosselin et al. ........... 428/40.1
5,895,075 A 4/1999 Edwards ...................... 283/81
6,096,153 A * 8/2000 Nowaczyk .................. 156/199
6,404,341 B1 * 6/2002 Reid ....................... 340/572.8

* cited by examiner

*Primary Examiner*—Linda Gray
(74) *Attorney, Agent, or Firm*—Lathrop & Gage LC

(57) ABSTRACT

A method for forming a securing label including affixing a security activating material to a substrate to form a sub-assembly label, attaching the sub-assembly label to a top label material, and cutting the top label material to form a top label where the sub-assembly label and the top label form the securing label. Attaching of sub-assembly layer includes inserting the sub-assembly layer between a paper layer and a carrier layer of the top label material which have been separated from each other and then remarried after insertion.

4 Claims, 1 Drawing Sheet

Fig. 1.
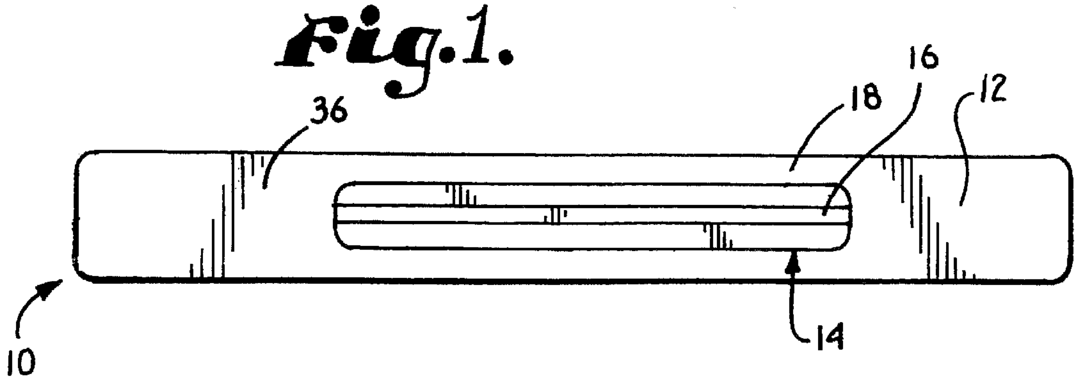
Fig. 2.
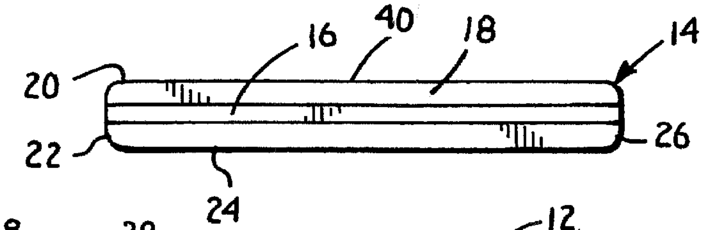
Fig. 3.
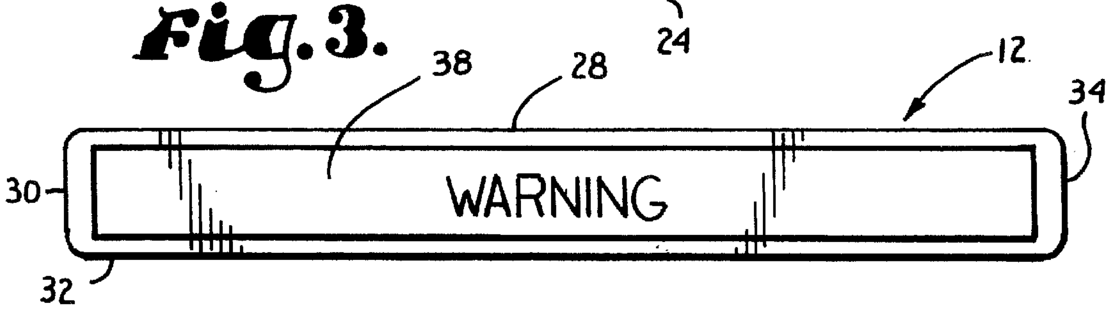
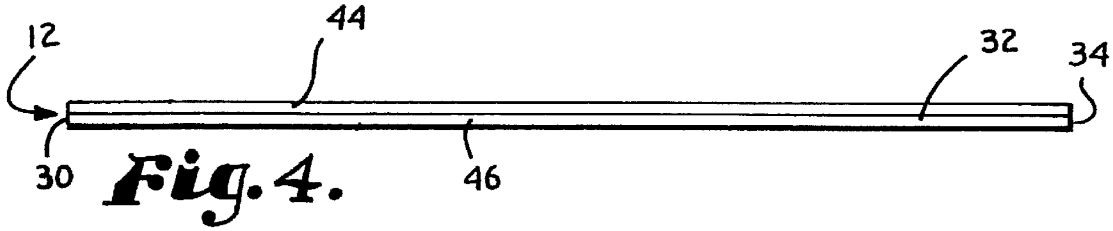
Fig. 4.
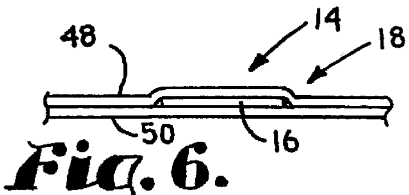
Fig. 5.
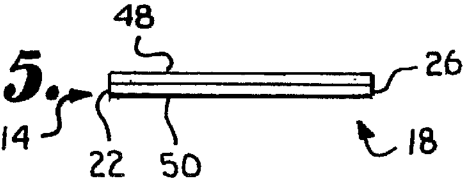
Fig. 6.
Fig. 8.
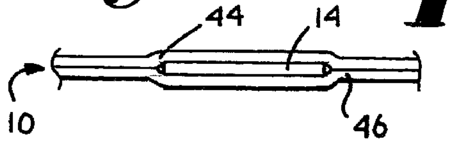
Fig. 7.
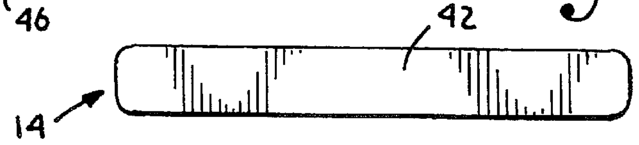

METHOD OF MAKING A SECURITY LABEL

FIELD OF INVENTION

The present invention relates to a security label, preferably for use in the video cassette, DVD discs, and video game retail and rental industry, and a method for forming such security label. In particular, the security label is a dual label construction comprised of a sub-assembly label and a top label, whereby the sub-assembly label is located within the periphery of the top label.

BACKGROUND OF INVENTION

The video cassette and game retail and rental industry is a well established industry that annually rents or sells millions of movies and games to consumers. As would be expected, the theft of the rental movie cassettes, DVD discs, and video games is a prevalent problem. In particular, a problem exists whereby rental movies and games are shoplifted prior to being rented. For the owners of businesses that rent these DVD discs, tapes, and games, it is necessary to have various security measures in place to prevent such theft.

One necessary security measure is to locate a metal strip or similar material on the video cassette or game. An electronic gate, or similar security structure, is then put in place so that if a person tries to steal a video tape or game by concealing such item and walking out of the store, an alarm will be activated when the thief passes through the gate. This is a common security measure that is easily implemented into video rental stores to prevent theft. Unfortunately, such security measures may be circumvented by removing the metal strip, or similar material, from the video cassette or game. Typically, the metal strips are easily removed because they are readily visible and can be easily located and removed by a potential thief. For this reason, it has become necessary to conceal the metal strip and to make the metal strip difficult to remove.

While the metal strips are typically used to prevent theft of DVD discs, video tapes, and video games, such security measures can be used in association with a variety of different retail items. As such, it is desired to not only prevent theft of video tapes and games, but other retail items. Thus, it is desired to have a security system that can be used to prevent theft of any of a variety of retail items.

To conceal the visibility of the metal strip, labels disclosing information, which are often necessary, to a consumer can be used to mask or conceal such metal strip. However, the metal strip is typically in contact with at least one edge of the label, and, more likely, two edges of such label. Location on the edge allows the potential thief to remove such concealed metal strip by locating the metal strip on the edge of the label and removing the metal strip. The thief can then walk through the detection gates without activating the security system. For this reason, it is necessary to have a label that does not have the metal strip located near an edge of the label.

It is possible to conceal the metal strip without the strip contacting the edges of the label. However, to achieve such result, it is typically necessary to hand apply the metal strip, followed by applying by hand the label which conceals the metal strip. This is disadvantageous because it is time consuming and not in conformance with what is becoming standard procedure in the video tape and game rental industry. In particular, it is desirable to machine apply labels at a warehouse so that when the video tapes and games are shipped to the various rental and retail stores, application of security measures is no longer required.

Concealing the metal strip within a machine or hand appliable label has been exceptionally difficult to accomplish. In particular, a method for forming a suitable machine appliable security label, whereby the metal strip is concealed and located away from the edges of the label, has heretofore been unknown. Thus, it is desired to have a method of forming a security label that has a metal strip located away from the label edges and concealed from view.

SUMMARY OF INVENTION

The present invention relates to a security label comprised of two attached label members, which are formed into the security label prior to attachment of the security label onto a retail item, such as a video tape or game. Located within or on one label member will be a material designed to activate a security system. Typically, the material will be a magnetic metal or similar composition. Once formed, the security label will be placed on a retail item so that if the thief attempts to steal the retail item, a security system will be activated once the material designed to activate a security system breaks the plane of a particular security zone. For example, it is preferred to place a metal strip underneath the surface of the security label so that when the retail item passes through an electronic gate, which forms an electromagnetic field, the security system will be activated, alerting the employees of the store that the person is attempting to steal the item. The present invention also relates to a method for forming the security label whereby two labels are married so that the material that activates the security system is located away from the outer edges of the security label. The security label can be of any shape or dimension, as long as the security system is activated when the label breaks the system's plane.

It is preferred if the two labels which comprise the security label are a subassembly label and a top label. The sub-assembly label will hold the material that activates the security system and will be located within the periphery of the outer edges of the top label. The two labels will be married to one another to form a unitary label, which is the security label. Preferably, the sub-assembly label will be made from a material comprised of two discrete layers that can be separated so that the material that activates the security system can be placed therebetween. More preferably, the two layers will be separated with a metal strip placed therebetween, such metal strip will activate a security system. Once the metal strip is in place, the layers will be remarried to form a sub-assembly layer material which can be cut or processed to form the subassembly layer. The metal strip can be of any construction, as long as the security system is activated. As such, the size and dimension of the metal strip will depend in part on the metal selected for use.

The top label will preferably be of a size larger than the sub-assembly layer so that the sub-assembly layer is located within the periphery of the outer edges of the top label. Thus, the top label circumference should be greater than the sub-assembly label or, at the very least, should be of a construction that does not allow the metal material to contact the edge or edges of the top layer. Additionally, it is preferred for the top label to be made from a material comprised of two discrete layers that can be separated so that the sub-assembly layer can be inserted therebetween, with the two layers remarried to form a unitary security label. Regardless, it is necessary to attach the subassembly label to the top label to form a security label. An adhesive can be placed on one face of the security label prior to formation, or after formation, so that the security label can then be attached fixedly to a video cassette or game.

It is believed necessary to use the dual label construction to form the security label because of the difficulty of forming a label having a metal strip, while still concealing the metal strip. Thus, it is believed pertinent to the present invention to first form the sub-assembly label comprised of the material used to form the sub-assembly label and the metal strip or material designed to activate the security system. Then the top label is formed and the two labels are married to form the security label. Once the security label is formed, it will then be optionally placed in a form that allows it to be machine appliable to various retail items, including DVD discs, video tapes and games. It is desirable that the security label be machine appliable as this eliminates the necessity of hand application of the labels and results in a label that is more convenient for use by the distributor of the games and tapes. However, the present label can be hand applied.

As such, the resulting security label is desirable because it can be machine applied to retail items, especially video tapes and games, and DVD discs. More importantly, a double label assembly is formed that can be readily placed on retail items while still resulting in a security material that is readily concealed from view. The material for activating the security gate is not readily or easily removed from the security label and is difficult to locate with the human eye.

DETAILED DESCRIPTION OF DRAWINGS

FIG. 1 is a top plan view of the security label, showing the sub-assembly label located on the top label;

FIG. 2 is a top plan view of the sub-assembly label;

FIG. 3 is a top plan view of the top label;

FIG. 4 is an exploded side view of the preferred top label;

FIG. 5 is an exploded side view of the preferred sub-assembly label;

FIG. 6 is a front cross-sectional view of the sub-assembly label;

FIG. 7 is a bottom plan view of the sub-assembly label; and,

FIG. 8 is a front, cross-sectional view of the security label.

DETAILED DESCRIPTION

The present invention relates to a security label, that can be preferably machine applied, designed to activate a security device that generates an electronic field, such as an electronic gate, so as to prevent the theft of a retail item on which the security label is placed. The security label 10, as shown in FIGS. 1 and 8, is comprised of a top label 12, having a sub-assembly label 14 located within the periphery of the top label. Importantly, the sub-assembly label 14 does not contact the edges of the top label 12. This allows for a metal strip 16 or similar material to be hidden below the surface of the top label so that it is more difficult for a potential thief to locate the metal strip 16. Such strip 16 is necessary to activate the security device. As such, the sub-assembly label 14, as shown in FIGS. 1, 2, and 6 will be comprised of the metal strip 16 held by a substrate material 18.

The top label 12 is shown in a preferred construction in more detail in FIG. 3, and will be comprised of an outer edge, which can be a continuous edge or multiple edges, and opposed faces. The top label can have any of a variety of shapes and dimensions, including rectangles, boxes, strips, half-moon shapes, circles, triangles, and a variety of other shapes and designs. More preferably, the top label 12 will have a rectangular shape so that it has four edges 28, 30, 32, and 34, as shown in FIG. 3. Additionally, as shown in FIGS. 1 and 3, the top label 12 will have opposed faces 36 and 38, with one face 36 having adhesive located thereon, also known as the adhesive face, and the opposite face or print face 38 having scripting, or printing, located thereon. The print face 38 can alternatively be a blank or white. Preferably, the top label will be formed from a material comprised of two distinct layers 44 and 46, shown in FIG. 4, a paper or face layer 44, which is used to form the print face, and a carrier or polyester layer 46, which is used to form the adhesive face. The paper layer is desired because it can readily be printed on. If the paper layer is not printed on, it can be made into a blank or white label. Thus, the paper layer 44 will form the print face 38. The polyester layer 46 is desired because it imparts rigidity and strength to the top label, with the polyester layer forming the adhesive face 36.

Any type of adhesive that will allow the sub-assembly label 14 and the top label 12 to be attached fixedly to one another, if that is the desired construction, can be used. While the adhesive can be used to fixedly attach the top label and sub-assembly label together, it is necessary, and more important, for the adhesive to be of a sufficient strength to allow the security label 10 to be attached fixedly to a video cassette or game.

The design of the top label 12 is preferred so that, if desired, printing or scripting can be placed on one face 38 of the top label 12 to impart information to consumers. While the top label can be of any length, width, shape, and dimension, it is generally preferred for the top label to be approximately 14.5 centimeters (cm) or greater in length, and have a width equal to at least 1 cm. Such dimensions are desired, ad as they allow for a top label that will sufficiently conceal the metal strip 16, as well as allowing the metal strip to have a sufficient length to activate a security system. Any dimension, however, can be used, as long as the top label sufficiently conceals the security activating material, with enough material present to activate a security device.

The sub-assembly label 14 is shown with greater specificity in FIGS. 2, 5, 6, and 7. As mentioned, the sub-assembly label will be comprised of a metal strip 16 fixedly held by a substrate material 18. As such, the sub-assembly label 14 will have opposed faces 40 and 42, shown in FIGS. 2 and 7, and at least one outer edge. Like the top label, the sub-assembly label can be of any of a variety of shapes and dimensions, including rectangles, boxes, strips, half-moon shapes, circles, triangles, and a variety of other shapes and designs. More preferably, the sub-assembly label will have a rectangular construction, similar to the top label 12, so that the sub-assembly label 14 has four edges, 20, 22, 24, and 26. Any design, however, can be used, as long as the metal strip 16, or security activating material, can be attached fixedly to or held by the substrate material 18 to form the sub-assembly label 14 that can be placed on and concealed within the top label 12, while still allowing for activation of a security device. The substrate material 18 is preferably made from a semi-rigid material, such as polyester; however, any material may be used, as long as the metal material can be placed thereon so as to prevent curling and the metal material is fixedly held onto the substrate material.

In forming the security label 10, it is necessary to simply attach the metal strip 16 to the substrate material 18. This can be accomplished in any of a number of ways, including placing a glue or adhesive on a face of the sub-assembly label 14 and attaching the metal strip to the surface so that the glue will fixedly hold the metal strip to the substrate material.

It is more preferred if the substrate material 18 is comprised of two discrete layers, 48 and 50, shown in FIGS. 5 and 6, a clear or semi-gloss layer 48 also known as a face sheet, and a rigid or polyester layer 50. The preferred two layer construction for the sub-assembly layer is shown in FIG. 4. Preferably, the clear layer 48 corresponds to face 42 and the polyester layer 50 to face 40. The two layer construction is desired because the two layers, 48 and 50, can be separated with the metal strip 16 inserted, thereby making it more difficult to remove the metal strip 16 from the security label. This is shown in FIG. 6. Also, the semi-gloss or clear layer 48 can be colored, preferably darkened, shown in FIG. 7, so as to further conceal the metal strip 16 from the potential thief's view.

The metal strip 16 can be made from any of a variety of metals or compositions that will activate an electronic security device, with the metal strip 16 having any of a variety of shapes and dimensions. More particularly, the metal strip can be any material that can be placed on a label, hidden, and used to activate a security system when a thief tries to steal a tape or game. Thus, the metal strip 16 can be made from any of a variety of magnetic metals, including amorphous metal, that will activate a security device. The metal strip is most preferably a metallic glass or amorphous metal. The metal strip 16 must be of a sufficient construction to allow it to be located on the sub-assembly label 14 without the metal strip curling or pulling away from the substrate material. In particular, the metal strip should lay flat on the substrate material. Also, the security material or metal strip must be sufficiently magnetic so that a comparatively small strip can be used while still activating the security device. An example of a metal strip of suitable size is one whereby the metal strip is about 8 cm long and about 2 mm wide. While a strip construction is preferred because it will lay flat, and sufficient metal can be included to activate the device, any design or construction can be used that will sufficiently activate the device, including squares, chips, circular shapes, and a variety of other constructions and designs.

Once the top label 12 and the sub-assembly label 14 have been formed, they can be attached to one another to form the security label 10. Importantly, the sub-assembly layer 14 must be attached in a manner so that a sub-assembly layer is within the periphery of the top label 12. It is important that the metal strip 16 not be located on or near an edge of the top label so as to thereby make it more difficult to remove, or "zipper out", the metal strip. Preferably, the sub-assembly layer is located at least 1 mm from the outer edge of the top label. More preferably, the sub-assembly label is located at least 5 mm from the top label edges. The sub-assembly 14 can be fixedly attached by locating such label on the adhesive face 36 of the top label 12.

In the alternative, it is more preferred to separate layers 44 and 46 of the top label 12 and to locate the sub-assembly label 14 between layers 44 and 46, as shown in FIG. 8. When this is done, the sub-assembly label 14 should be located such that the metal strip does not contact the edges of the top label. Once the sub-assembly layer 14 is inserted, the layers 44 and 46 are returned to the previous position and sealed to form the security label 10. Other methods can be used, as long as the sub-assembly label is fixedly attached to the top label and the metal strip is located within the periphery of the top label.

While polyester is preferred for use in both the top label 12 and the sub-assembly label 14, any semi-rigid material can be used that will adequately hold a metal strip. Preferably, the material will have a machine direction elongation equal to 150% and cross direction break equal to 110%. Also, the material should have a tear strength equal to 36,000 psi in the machine direction and 40,000 psi in the cross direction.

The method for forming the security label 10 includes forming the sub-assembly layer 14, with the metal material or material designed to activate the security system held by the sub-assembly layer. Preferably, the method includes separating two layers that comprise the material used to form the sub-assembly label, so that a metal strip is located therebetween, and the two layers are remarried. This can be achieved using any of a variety of different types of equipment which are common in the industry that are designed to separate a face layer from a carrier layer. Such equipment is readily available.

After the two sub-assembly layers are remarried, the reformed sub-assembly material is passed through a die and cut to the desired size to prepare for placement on the top label. The top label 12 material will then be preferably separated by a known machine with the sub-assembly label 14 located between the two separated layers, with the layers then remarried to form a unitary material. This material is then passed through a standard die and cut to the desired label size. The labels are then ready to be placed on any retail item that can hold a label, including DVD discs, video tapes or games, by hand or, more preferably, by a label machine.

Attempted theft of an item having the security label should become less likely, as it will be difficult to remove the metal strip, which activates the security device, from the video cassette or game.

Thus, there has been shown and described a security label product which fulfills all the objects and advantages sought therefore. It is apparent to those skilled in the art, however, that many changes, variations, modifications, and other uses and applications for the security label product are possible, and also such changes, variations, modifications, and other uses and applications which do not depart from the spirit and scope of the invention are deemed to be covered by the invention which is limited only by the claims which follow.

What is claimed is:

1. A method for forming a security label for activating a security device, said security label designed to prevent theft of a retail item on which said security label is affixed, comprising:

selecting a two layer material comprising a carrier layer and a face sheet for use as a substrate material;

separating said layers on a press;

inserting a security activating material between said layers;

remarrying said layers to form a sub-assembly layer material;

cutting said material to form said sub-assembly label;

attaching said sub-assembly label to a top label material; and cutting said top label material to form a top label having at least one outer edge, a print face, and an adhesive face, with said faces opposed to one another, and said sub-assembly label located within said top label edge, with said sub-assembly label and said top label forming said security label.

2. The method of claim 1 wherein said top label material is formed from a two layer material comprising a paper layer and a carrier layer.

3. A method for forming a security label for activating a security device, said security label designed to prevent theft of a retail item on which said security label is affixed, comprising:

attaching fixedly a security activating material to a substrate material to form a sub-assembly label;

attaching said sub-assembly label to a top label material comprising separating a paper layer from a carrier layer of said top label material and inserting said sub-assembly label between said paper layer and said carrier layer;

remarrying said carrier layer with said paper layer; and cutting said top label material to form a top label having at least one outer edge, a print face, and an adhesive face, with said faces opposed to one another, and said sub-assembly label located within said top label edge, with said sub-assembly label and said top label forming said security label.

4. The method of claim 1 wherein said method includes placing said security label on a DVD disc, or a video cassette or game.

* * * * *